United States Patent
Calvert et al.

(10) Patent No.: US 9,394,975 B1
(45) Date of Patent: Jul. 19, 2016

(54) CONTINUOUSLY VARIABLE TRANSMISSION

(71) Applicant: Caterpillar Inc., Peoria, IL (US)

(72) Inventors: Glen P. Calvert, Washington, IL (US); Gaurav Vasudeva, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/703,507

(22) Filed: May 4, 2015

(51) Int. Cl.
*F16H 3/72* (2006.01)

(52) U.S. Cl.
CPC .......... *F16H 3/72* (2013.01); *F16H 2200/0039* (2013.01); *F16H 2200/0086* (2013.01); *F16H 2200/2015* (2013.01); *F16H 2200/2043* (2013.01)

(58) Field of Classification Search
CPC ............. F16H 3/62; F16H 3/72; F16H 3/724; F16H 3/725; F16H 2200/0039; F16H 2200/0086; F16H 2200/2015; F16H 2200/2043
See application file for complete search history.

(56) References Cited

U.S. PATENT DOCUMENTS

| 7,213,480 | B2 | 5/2007 | Carlsson |
| 7,941,259 | B2 | 5/2011 | Tabata et al. |
| 8,303,448 | B2 | 11/2012 | Hiraoka et al. |
| 8,523,724 | B2 | 9/2013 | Moloney |
| 8,758,181 | B2 | 6/2014 | Calvert |
| 2013/0196812 | A1 | 8/2013 | Smemo et al. |
| 2014/0038766 | A1* | 2/2014 | Koch et al. ............ 475/276 |
| 2014/0296021 | A1 | 10/2014 | Lee et al. |

FOREIGN PATENT DOCUMENTS

| WO | 2009127473 A1 | 10/2009 |
| WO | 2014067635 A1 | 5/2014 |

* cited by examiner

*Primary Examiner* — Huan Le
(74) *Attorney, Agent, or Firm* — Miller, Matthias & Hull LLP

(57) ABSTRACT

A planetary gear train is disclosed. The planetary gear train may include a first planetary gear set, a second planetary gear set, a third planetary gear set, a fourth planetary gear set and a fifth planetary gear set between an input end and an output end. The planetary gear train may further include a brake set having a first brake, a second brake and a third brake, and a clutch set having a first clutch and a second clutch. The first brake, the second brake and the third brake, the first clutch and the second clutch may be selectively actuable to produce three different forward speed ranges and two different reverse speed ranges between the input end and the output end.

19 Claims, 4 Drawing Sheets

| First Clutch | Second Clutch | First Brake | Second Brake | Third Brake | Transmission State |
|---|---|---|---|---|---|
| X |  |  |  |  | Forward Range 1 |
|  | X |  |  | X | Forward Range 2 |
|  | X |  | X |  | Forward Range 3 |
| X |  | X |  |  | Riverse Range 1 |
|  | X | X |  |  | Riverse Range 2 |
|  |  |  |  |  | Neutral |

FIG.4

CONTINUOUSLY VARIABLE TRANSMISSION

TECHNICAL FIELD

This disclosure generally relates to powered machine transmissions and, more specifically, relates to planetary gear continuously variable powered machine transmissions.

BACKGROUND

Generally speaking, a power source for powered machines has a limited range of output rotation per minute (RPM). Because of this, most powered machines also employ a multispeed transmission to provide a greater range of machine speed, such as a continuously variable transmission (CVT). Typically, CVTs include a primary shaft and one or more countershaft type clutch shafts having rotating clutches. These countershaft CVTs require seals to accommodate the rotation of the multiple shafts, and further require devices that prevent auto-engagement of such CVTs. Consequently, these countershaft CVTs are large in size because of the multiple centerlines. Accordingly, in order to decrease fuel consumption, and thereby increase operational efficiency, powered machine designers are continually seeking ways to decrease the footprint of CVTs, while maintaining or increasing power throughput.

One attempt to solve the foregoing problem is illustrated in U.S. Pat. No. 8,303,448 (the '448 patent) to Kubota. The '448 patent is directed to a CVT having one centerline along which three planetary gear sets and two different clutch sets are positioned, and which fails to include any brakes. Furthermore, the two different clutch sets may be selectively engaged to provide only two forward speed ranges and two reverse speed ranges between an input and an output.

The present disclosure is directed to overcoming one or more problems set forth above and/or other problems associated with the prior art.

SUMMARY

In accordance with one embodiment of the present disclosure, a planetary gear train is disclosed. This planetary gear train may include a first planetary gear set, a second planetary gear set, a third planetary gear set, a fourth planetary gear set and a fifth planetary gear set positioned between an input end and an output end. Additionally, this planetary gear train may include a brake set including a first brake, a second brake and a third brake. Furthermore, this planetary gear train may include a clutch set comprising a first clutch and a second clutch, and the first brake, the second brake, the third brake, the first clutch and the second clutch being selectively actuable to produce three different forward speed ranges and two different reverse speed ranges between the input end and the output end.

In accordance with another embodiment of the present disclosure, a continuously variable transmission for a powered machine having three forward speed ranges and two reverse speed ranges between an input and an output in disclosed. This transmission may include a first input for receiving rotational power from a primary power source and a second input for receiving rotational power from a secondary power source. Furthermore, this transmission may include a first planetary gear group including a first planetary gear set and a second planetary gear set and a second planetary gear group including a third planetary gear set, a fourth planetary gear set and a fifth planetary gear set. Further, this transmission may include a clutch set, and this clutch set may be located between the first planetary gear group and the second planetary gear group, and including a first clutch and a second clutch. Finally, this transmission may include a brake set, the brake set including a first brake, a second brake and a third brake, and furthermore the first brake, the second brake, the third brake, the first clutch and the second clutch may be selectively controllable to provide the three forward speed ranges and the two reverse speed ranges between the input end and the output end.

In accordance with another embodiment of the present disclosure, a planetary gear transmission capable of producing three forward speed ranges and two reverse speed ranges, and including five planetary gear sets positioned along a centerline is disclosed. The transmission may include a first ring gear of a first planetary gear set linked to a second carrier of a second planetary gear set, and the second carrier may be further linked the to a clutch set. This transmission may also include a first sun gear of the first planetary gear set being linked to a second sun gear of the second planetary gear set. Furthermore, the second sun gear may be further linked to the clutch set. Moreover, this transmission may include a third ring gear of a third planetary gear set linked to the clutch set. Further, this transmission may include a fourth sun gear of a fourth planetary gear set and this fourth sun gear may be further linked to a fifth ring gear of a fifth planetary gear set.

These and other aspects and features of the present disclosure will be more readily understood when read in conjunction with the accompanying drawings.

BRIEF DESCRIPTION

FIG. 4 is a chart illustrating clutch and brake activation patterns, and the resulting direction and speed ranges, for a planetary gear continuously variable transmission constructed in accordance with the present disclosure.

DETAILED DESCRIPTION OF THE DISCLOSURE

Figure 1:
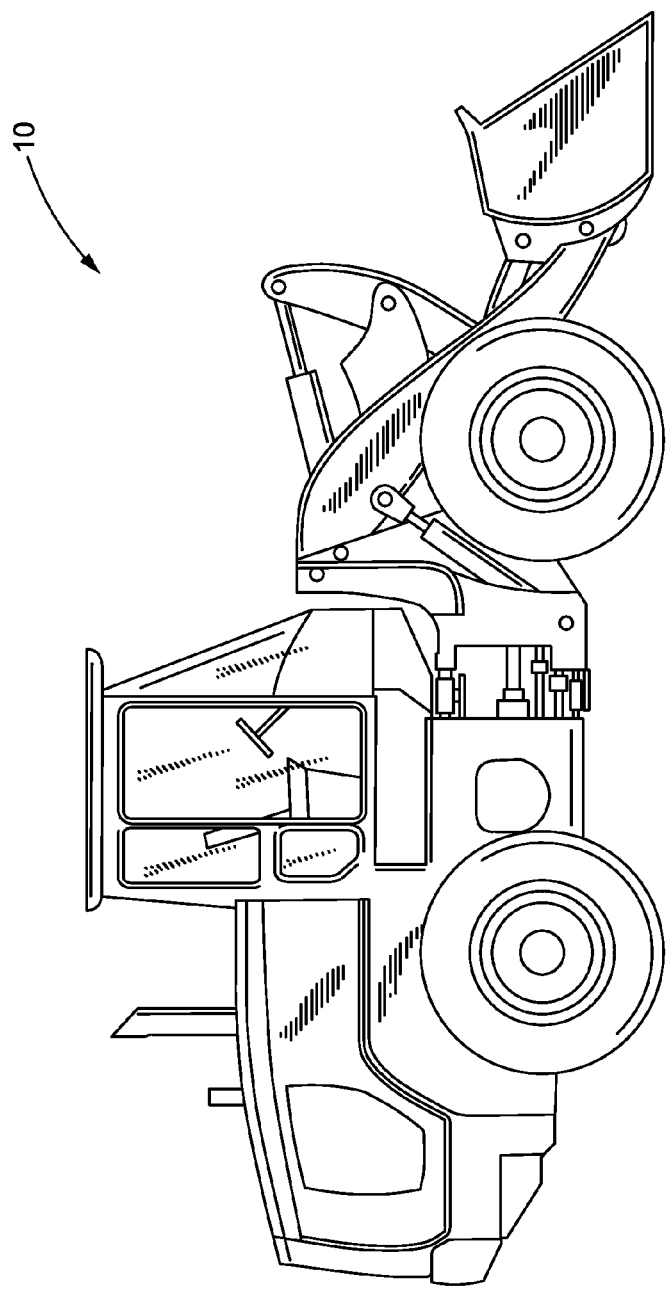
FIG. 1 is a side, plan view of a powered machine constructed in accordance with the present disclosure.

Referring now to the drawings, and with specific reference to FIG. 1, a powered machine is shown and generally referred to by reference numeral 10. While the powered machine 10 depicted is a wheel loader, it is to be understood that this is only exemplary, as the teaching of the present disclosure can be employed elsewhere too. For example, the present disclosure may be utilized with another powered machine 10, such as, automobiles, pickup trucks, on highway trucks, off highway trucks, articulated trucks, asphalt pavers, cold-planers, excavators, compactors, track-type tractors, motor graders, forest skidders, backhoe loaders, forklifts and the like.

Figure 2:
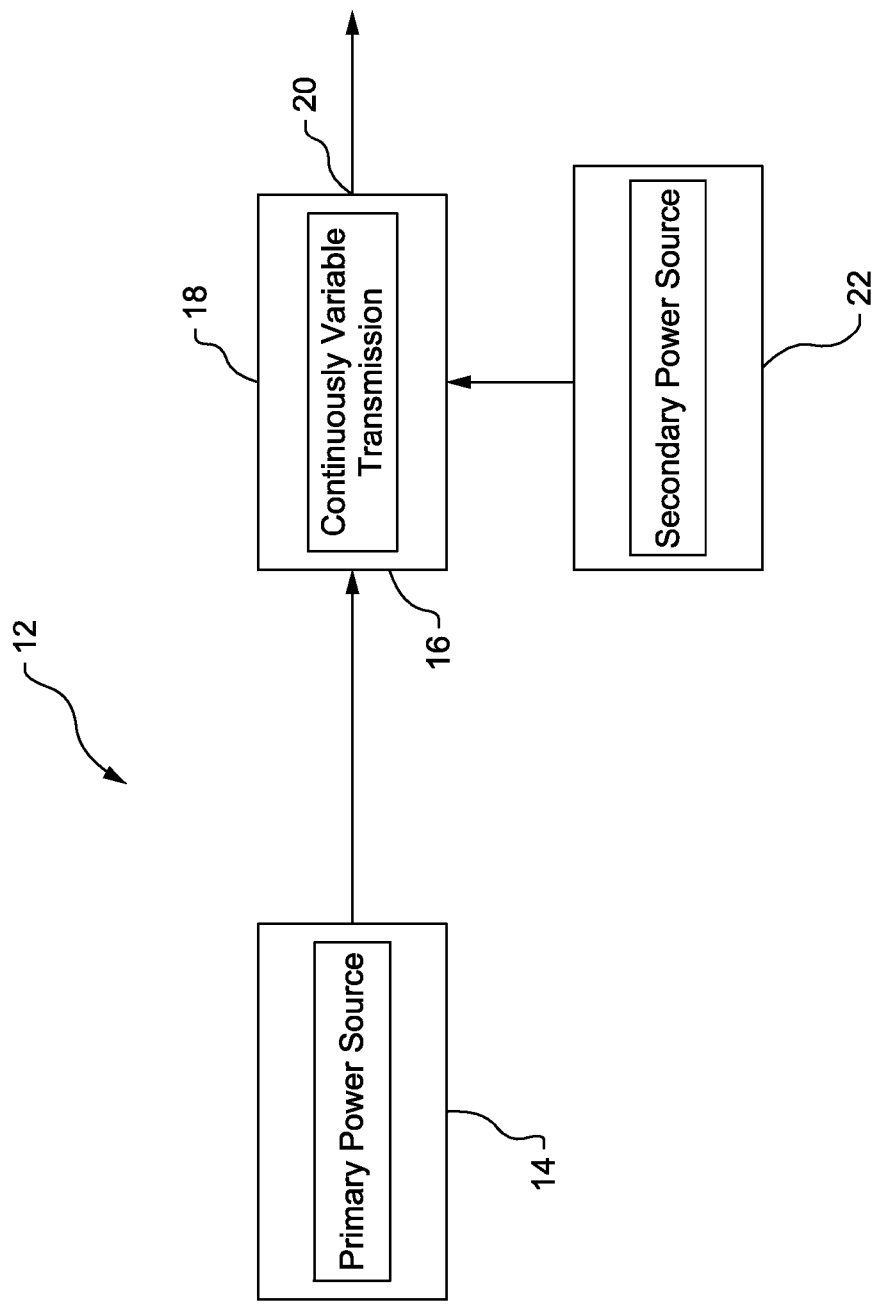
FIG. 2 is a schematic of a portion of a power train that may be used in conjunction with the powered machine of FIG. 1.

Turning now to FIG. 2, a portion of a power train of the powered machine 10 is schematically depicted and generally referred to by reference numeral 12. The power train 12 of the powered machine 10 may include a primary power source 14, such as internal combustion engine, an electrical motor, a hydraulic motor and the like. The primary power source 14 may be operatively engaged with an input end 16 of a continuously variable transmission 18. The continuously variable transmission 18 may further include an output end 20. As power from the primary power source 14 is created, it may be passed to the input end 16 of the continuously variable transmission 18. As this power is transferred through the continuously variable transmission 18 to the output end 20, the power may be converted to a rotating driven load having a different rotation per minute (RPM) than at the input end 16, and may also rotate in an opposite direction than at the input end 16.

In some embodiments, the power train 12 may further include a secondary power source 22. While not meant to be limiting, the secondary power source 22 may be, for example, an additional internal combustion engine, another electric motor or the like. In some instances, the secondary power source 22 may be a hydraulic variator, and this hydraulic variator may receive its power from the primary power source 14 in order to function. A hydraulic variator may be, for example, a variable displacement swashplate-style hydraulic pump, and a motor, operatively configured to operate together. This secondary power source 22 may also be operatively engaged with the input end 16 of the continuously variable transmission 18 and may be utilized to provide additional torque to power train 12 of the powered machine 10.

Figure 3:
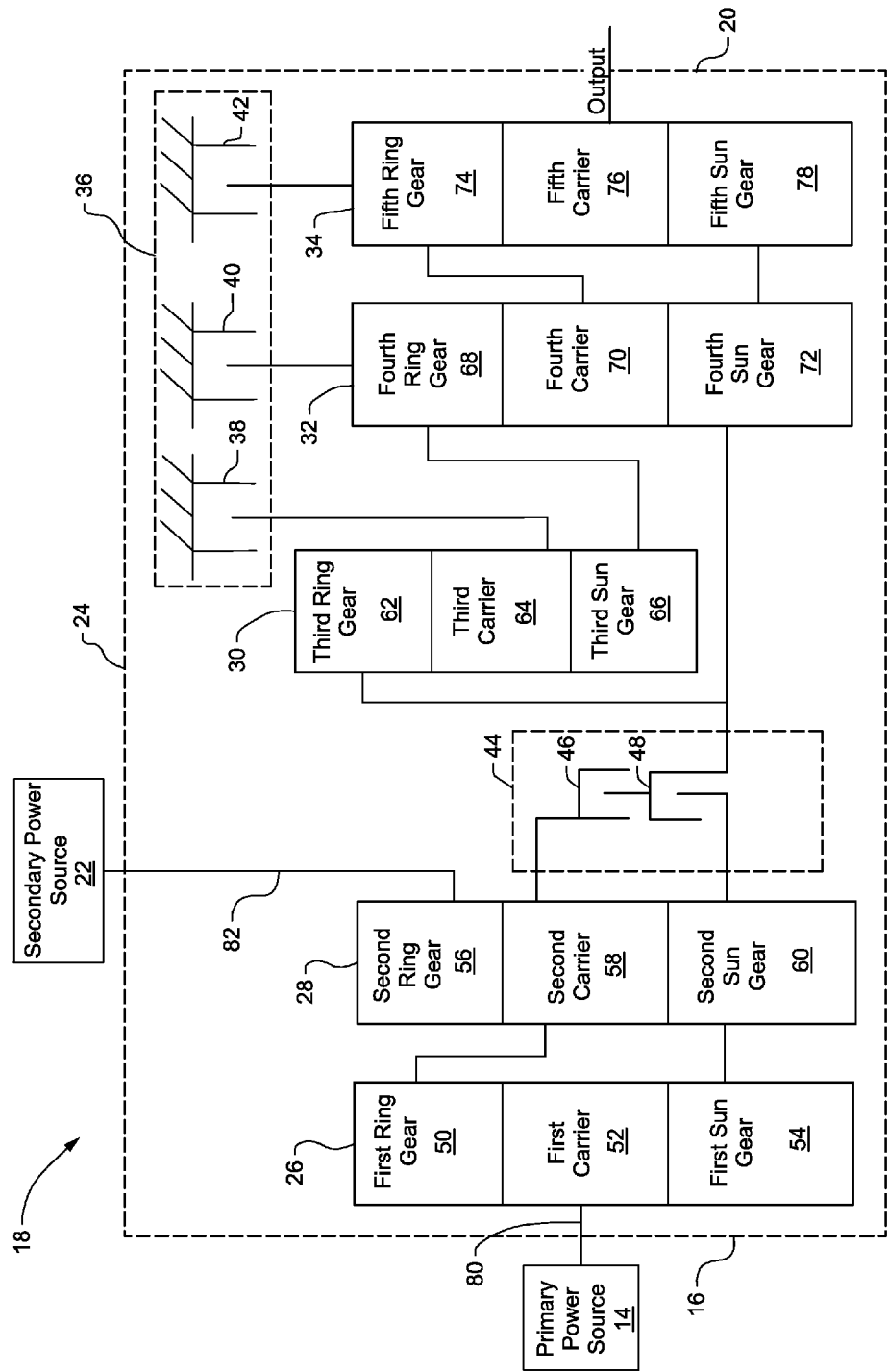
FIG. 3 is a diagram of a planetary gear based continuously variable powered machine transmissions having three forward speed ranges and two reverse speed ranges constructed in accordance with the present disclosure.

In order to decrease fuel consumption, and thereby increase operational efficiency, powered machine 10 designers are continually seeking ways to decrease the footprint of a continuously variable transmission 18, while maintaining or increasing its power throughput. Turning now to FIG. 3, one such continuously variable transmission is depicted and is referred to by reference numeral 18. As seen there, the continuously variable transmission 18 may include a planetary gear train 24 encompassed by a dashed box. The planetary gear train 24 may include a first planetary gear set 26, a second planetary gear set 28, a third planetary gear set 30, a fourth planetary gear set 32 and a fifth planetary gear set 34. Additionally this planetary gear train 24 may include a brake set 36 encompassed by a dashed box. This brake set 36 may include a first brake 38, a second brake 40 and a third brake 42.

Furthermore, the planetary gear train 24 may include a clutch set 44, such as encompassed in the dashed box. As seen in this figure, the clutch set 44 may include a first clutch 46 and a second clutch 48. In operation, the first brake 38, the second brake 40, the third brake 42, the first clutch 46 and the second clutch 48 of such a planetary gear train 24 may be selectively actuable to produce three different forward speed ranges and two different reverse speed ranges between the input end 16 and the output end 20.

Furthermore, as shown in this figure, the first planetary gear set 26 may include a first ring gear 50, a first carrier 52 and a first sun gear 54. Likewise, the second planetary gear set 28 may comprise a second ring gear 56, a second carrier 58 and a second sun gear 60. Additionally, the third planetary gear set 30 may include a third ring gear 62, a third carrier 64 and a third sun gear 66. The fourth planetary gear set 32 may include a fourth ring gear 68, a fourth carrier 70 and a fourth sun gear 72. Finally, as seen in FIG. 3, the fifth planetary gear set 34 may include a fifth ring gear 74, a fifth carrier 76 and a fifth sun gear 78.

Now while referring to FIGS. 2-3, it is seen that the input end 16 may further include a first input 80 and a second input 82. The first input 80 may be configured to receive rotational power from the primary power source 14, while the second input 82 may be configured to receive rotational power from the secondary power source 22. As further seen in FIG. 3, the first input 80 may be operatively coupled to the first carrier 52, while the second input 82 may be operatively coupled to the second ring gear 56.

Referring now only to FIG. 3, it is seen that the first brake 38 is operatively coupled to the third carrier 64, and accordingly is located and configured to selectively brake the third carrier 64. Furthermore, the second brake 40 is operatively coupled to the fourth ring gear 68, and thus is located and configured to selectively brake the fourth ring gear 68. Moreover, the third brake 42 is operatively coupled to the fifth ring gear 74, and therefore is located and configured to selectively brake the fifth ring gear 74.

Furthermore, as seen in this figure, the first ring gear 50 is tied to the second carrier 58, which is further tied to the first clutch 46. Moreover, the first clutch 46 may be selectively tied to the third ring gear 62, the fourth sun gear 72 and the fifth sun gear 78. Consequently, the first clutch 46 may selectively tie the first ring gear 50 and the second carrier 58 to the third ring gear 62, the fourth sun gear 72 and the fifth sun gear 78.

Moreover, as depicted in this figure, the first sun gear 54 may be tied to the second sun gear 60, which is further tied to the second clutch 48. It is additionally seen that the second clutch 48 may be selectively tied to the third ring gear 62, the fourth sun gear 72 and the fifth sun gear 78. Accordingly, the second clutch 48 may selectively tie the first sun gear 54 and second sun gear 60 to the third ring gear 62, the fourth sun gear 72 and the fifth sun gear 78.

Turning now to FIG. 4, exemplary clutch and brake activation patterns, and resulting direction and speed ranges, of the planetary gear train 24 are depicted. As seen there, each of the first clutch 46, the second clutch 48, the first brake 38, the second brake 40 and the third brake 42 are separately actuable. Furthermore, only one of the first clutch 46 or the second clutch 48 may be selectively engaged at any one time in order to produce a desired speed range. Furthermore, only one of the first brake 38, the second brake 40 or the third brake 42 may be selectively engaged at one time in order to produce the desired speed or rotation direction.

Turning now to FIGS. 3-4, it is seen that in operation the planetary gear train 24 may produce a first forward speed range by selectively engaging the first clutch 46 and the third brake 42. Accordingly, the engagement of the first clutch 46 and the third brake 42 selectively links the first ring gear 50 and second carrier 58 to the third ring gear 62, the fourth sun gear 72 and the fifth sun gear 78 through the clutch set 44. Further, in operation the planetary gear train 24 may produce a second forward speed range by selectively engaging the second clutch 48 and the third brake 42, thereby selectively linking the first sun gear 54 and second sun gear 60 to the third ring gear 62, the fourth sun gear 72 and the fifth sun gear 78 through the clutch set 44. In operation, the planetary gear train 24 may further produce a third forward speed range. In this instance, the second clutch 48 and the second brake 40 may be engaged to selectively link the first sun gear 54 and second sun gear 60 to the third ring gear 62, the fourth sun gear 72 and the fifth sun gear 78 through the clutch set 44.

The planetary gear train 24 may also produce two reverse speed ranges. In operation, the planetary gear train 24 may produce a first reverse speed range by selectively engaging the first clutch 46 and the first brake 38, thereby selectively linking the first ring gear 50 and second carrier 58 to the third ring gear 62, the fourth sun gear 72 and the fifth sun gear 78 through the clutch set 44. Furthermore, as seen from these figures, a second reverse speed range may be produced by selectively engaging the second clutch 48 and the first brake 38. The engagement of the second clutch 48 and the first brake therefore selectively links the first sun gear 54 and second sun gear 60 to the third ring gear 62, the fourth sun gear 72 and the fifth sun gear 78 through the clutch set 44.

INDUSTRIAL APPLICABILITY

In operation, a planetary gear train finds use in continuously variable transmissions. More specifically, such a planetary gear train finds use in continuously variable transmissions for powered machines, such as, automobiles, pickup trucks, on highway trucks, off highway trucks, articulated trucks, asphalt pavers, cold-planers, excavators, compactors, track-type tractors, motor graders, forest skidders, backhoe loaders, forklifts and the like.

It will be appreciated that in order to decrease the footprint of continuously variable transmissions, while maintaining or increasing power throughput, and furthermore to increase the commonality between parts of such transmissions, designers of such devices are actively seeking different ways to configure a plurality of planetary gear sets, clutch sets and brake sets. Accordingly, the current application discloses novel and non-obvious planetary gear trains directed toward this end. The planetary gear train may include first, second, third, fourth and fifth planetary gear sets located between an input end and an output end. Furthermore, these planetary gear trains may include a brake set comprising first, second and third brakes. Moreover, these planetary gear trains may further include a clutch set comprising a first clutch and a second clutch, and these clutches may be located between a first planetary gear group including the first and second planetary gear sets and a second planetary gear group including the third planetary gear set, the fourth planetary gear set and the fifth planetary gear set. Furthermore, the first brake, the second brake, the third brake, the first clutch and the second clutch may be selectively actuable to produce three different forward speed ranges and two different reverse speed ranges between the input end and the output end.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A planetary gear train, comprising:
    a first planetary gear set, a second planetary gear set, a third planetary gear set, a fourth planetary gear set, and a fifth planetary gear set positioned between an input end and an output end of the planetary gear train;
    a brake set including a first brake, a second brake, and a third brake; and
    a clutch set comprising a first clutch and a second clutch,
    wherein the first brake, the second brake, the third brake, the first clutch, and the second clutch are selectively actuable to produce three different forward speeds and two different reverse speeds between the input end and the output end,
    the first planetary gear set includes a first ring gear, a first carrier, and a first sun gear,
    the second planetary gear set includes a second ring gear, a second carrier, and a second sun gear, and
    the input end includes a first input and a second input, the first input being configured to receive rotational power from a primary power source and the second input being configured to receive rotational power from a secondary power source, the first input being operatively coupled to the first carrier and the second input being operatively coupled to the second ring gear.

2. The planetary gear train according to claim 1, wherein
    the third planetary gear set includes a third ring gear, a third carrier, and a third sun gear,
    the fourth planetary gear set includes a fourth ring gear, a fourth carrier, and a fourth sun gear, and
    the fifth planetary gear set includes a fifth ring gear, a fifth carrier, and a fifth sun gear.

3. The planetary gear train according to claim 2, wherein the first brake is configured to selectively brake the third carrier.

4. The planetary gear train according to claim 2, wherein the second brake is configured to selectively brake the fourth ring gear.

5. The planetary gear train according to claim 2, wherein the third brake is configured to selectively brake the fifth ring gear.

6. The planetary gear train according to claim 2, wherein the first ring gear is directly coupled to the second carrier, and
    wherein the first clutch is configured to selectively tie the second carrier to the third ring gear, the fourth sun gear, and the fifth sun gear.

7. The planetary gear train according to claim 2, wherein the first sun gear is directly coupled to the second sun gear, and
    wherein the second clutch is configured to selectively tie and the second sun gear to the third ring gear, the fourth sun gear, and the fifth sun gear.

8. A continuously variable transmission for a powered machine having three forward speeds and two reverse speeds between an input end and an output end, the continuously variable transmission comprising:
    a first input for receiving rotational power from a primary power source and a second input for receiving rotational power from a secondary power source;
    a first planetary gear group including a first planetary gear set and a second planetary gear set;
    a second planetary gear group including a third planetary gear set, a fourth planetary gear set, and a fifth planetary gear set;
    a clutch set being located between the first planetary gear group and the second planetary gear group, the clutch set including a first clutch and a second clutch; and
    a brake set including a first brake, a second brake, and a third brake,
    wherein the first brake, the second brake, the third brake, the first clutch, and the second clutch are selectively controllable to provide the three forward speeds and the two reverse speeds between the input end and the output end.

9. The continuously variable transmission for a powered machine according to claim 8, wherein
    the first planetary gear set includes a first ring gear, a first carrier and a first sun gear,
    the second planetary gear set includes a second ring gear, a second carrier and a second sun gear,
    the first ring gear is directly coupled to the second carrier,
    the first sun gear is directly coupled to the second sun gear,
    the first input is operatively coupled to the first carrier, and
    the second input is operatively coupled to the second ring gear.

10. The continuously variable transmission for a powered machine according to claim 9, wherein
    the third planetary gear set includes a third ring gear, a third carrier and a third sun gear,
    the fourth planetary gear set includes a fourth ring gear, a fourth carrier and a fourth sun gear, and the fifth planetary gear set includes a fifth ring gear, a fifth carrier, and a fifth sun gear.

11. The continuously variable transmission for a powered machine according to claim 10, wherein the first brake is operatively coupled to the third carrier, the second brake is operatively coupled to the fourth ring gear, and the third brake is operatively coupled to the fifth ring gear.

12. The continuously variable transmission for a powered machine according to claim 10, wherein the first ring gear is directly coupled to the second carrier, and
wherein the first clutch is configured to selectively couple the second carrier to the third ring gear, the fourth sun gear, and the fifth sun gear.

13. The continuously variable transmission for a powered machine according to claim 10, wherein the first sun gear is directly coupled to the second sun gear, and
wherein the second clutch is configured to selectively couple the second sun gear to the third ring gear, the fourth sun gear, and the fifth sun gear.

14. A planetary gear transmission capable of producing three forward speeds and two reverse speeds, and including five planetary gear sets positioned along a centerline, the five planetary gear sets including a first planetary gear set, a second planetary gear set, a third planetary gear set, a fourth planetary gear set, and a fifth planetary gear set, the planetary gear transmission comprising:
a first ring gear of the first planetary gear set linked to a second carrier of the second planetary gear set, the second carrier being further linked to a clutch set;
a first sun gear of the first planetary gear set linked to a second sun gear of the second planetary gear set, the second sun gear being further linked to the clutch set;
a third ring gear of the third planetary gear set linked to the clutch set; and
a fourth sun gear of the fourth planetary gear set linked to the clutch set, the fourth sun gear being further linked to a fifth sun gear of the fifth planetary gear set,
wherein a first carrier of the first planetary gear set is operatively coupled to a primary input power source, and wherein a second ring gear of the second planetary gear set is operatively coupled to a secondary input power source.

15. The planetary gear transmission according to claim 14, wherein the clutch set includes a first clutch and a second clutch, the second clutch being nested inside the first clutch,
wherein a third brake is operatively coupled to a fifth ring gear of the fifth planetary gear set, and
wherein selective actuation of both the first clutch and the third brake produces a first forward speed.

16. The planetary gear transmission according to claim 14, wherein the clutch set includes a first clutch and a second clutch, the second clutch being nested inside the first clutch,
wherein a third brake is operatively coupled to a fifth ring gear of the fifth planetary gear set, and
wherein selective actuation of both the second clutch and the third brake produces a second forward speed.

17. The planetary gear transmission according to claim 14, wherein the clutch set includes a first clutch and a second clutch, the second clutch being nested inside the first clutch,
wherein a second brake is operatively coupled to a fourth ring gear of the fourth planetary gear set, and
wherein selective actuation of both the second clutch and the second brake produces a third forward speed.

18. The planetary gear transmission according to claim 14, wherein the clutch set includes a first clutch and a second clutch, the second clutch being nested inside the first clutch,
wherein a first brake is operatively coupled to a third carrier of the third planetary gear set, and
wherein selective actuation of both the first clutch and the first brake produces a first reverse speed.

19. The planetary gear transmission according to claim 14, wherein the clutch set includes a first clutch and a second clutch, the second clutch being nested inside the first clutch,
wherein a first brake is operatively coupled to a third carrier of the third planetary gear set, and
wherein selective actuation of both the second clutch and the first brake produces a second reverse speed.

* * * * *